United States Patent
Sano et al.

(10) Patent No.: US 8,735,469 B2
(45) Date of Patent: May 27, 2014

(54) RESIN MATERIAL AND HIGH VOLTAGE EQUIPMENT USING THE RESIN MATERIAL

(75) Inventors: Akihiro Sano, Hitachinaka (JP); Atsushi Ohtake, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 272 days.

(21) Appl. No.: 13/212,336

(22) Filed: Aug. 18, 2011

(65) Prior Publication Data

US 2012/0061125 A1 Mar. 15, 2012

(30) Foreign Application Priority Data

Sep. 13, 2010 (JP) ................................. 2010-204208

(51) Int. Cl.
- *C08L 63/00* (2006.01)
- *H01B 3/00* (2006.01)
- *C08G 59/00* (2006.01)

(52) U.S. Cl.
USPC ........ 523/440; 174/138 C; 523/442; 523/443; 523/456; 523/458; 523/461; 523/466; 528/87

(58) Field of Classification Search
CPC .................................. C08L 63/00; C08K 9/06
USPC .......................................................... 528/87
See application file for complete search history.

(56) References Cited

U.S. PATENT DOCUMENTS

| | | | |
|---|---|---|---|
| 2006/0280873 A1* | 12/2006 | Smith et al. | 427/372.2 |
| 2007/0026221 A1* | 2/2007 | Stevens et al. | 428/325 |
| 2010/0319964 A1 | 12/2010 | Ootake et al. | |

FOREIGN PATENT DOCUMENTS

| | | |
|---|---|---|
| JP | 09-320342 | 12/1997 |
| JP | 09-326559 | 12/1997 |
| JP | 11-092687 | 4/1999 |
| JP | 2005-241977 | 9/2005 |
| JP | 2008-031193 | 2/2008 |
| JP | 2011-001424 | 1/2011 |
| JP | 2011-001523 | 1/2011 |
| JP | 2012-036322 | 2/2012 |

OTHER PUBLICATIONS

JP Office Action of Appln. No. 2010-204208 dated Dec. 25, 2012 with partial English translation.

* cited by examiner

*Primary Examiner* — Peter F Godenschwager
*Assistant Examiner* — David Karst
(74) *Attorney, Agent, or Firm* — Antonelli, Terry, Stout & Kraus, LLP.

(57) ABSTRACT

A resin material of high strength and high voltage equipment capable of improving the reliability by using the resin material, the resin material being a hardened product including fine particles and resin ingredients, in which the fine particles have hydrophobic groups on the surface and have a particle diameter of 200 nm or less, the resin ingredients have hydrophilic groups on the side chains, and the fine particles form a plurality of linear aggregates inside the resin, thereby forming a dendritic structure.

14 Claims, 4 Drawing Sheets

RESIN MATERIAL (B)

RESIN MATERIAL (C)

CRACK PROPAGATION IN RESIN MATERIAL (A)
(WITH NO FINE PARTICLES)(CONCEPTIONAL)

CRACK PROPAGATION IN RESIN MATERIAL (B)
(HYDROPHOBIZED SILICA)(CONCEPTIONAL)

RESIN MATERIAL (A)

RESIN MATERIAL (C)

US 8,735,469 B2

RESIN MATERIAL AND HIGH VOLTAGE EQUIPMENT USING THE RESIN MATERIAL

CLAIM OF PRIORITY

The present application claims priority from Japanese Patent Application serial No. 2010-204208, filed on Sep. 13, 2010, the content of which is hereby incorporated by reference into this application.

FIELD OF THE INVENTION

The present invention concerns an insulation resin material and high voltage equipment using the resin material to portions requiring electric insulation.

BACKGROUND OF THE INVENTION

In high voltage equipment, for example, molded transformers, switchgears, motors, and inverters, efficiency has been improved by reducing the size with a view point of energy saving and resource saving. In the high voltage equipment using insulation resins, reduction in the size results in problems of cracking and degradation of insulation due to reduction in the thickness of the film of the insulation resins. Accordingly, increase in the strength and in the withstanding voltage for the insulation resins are essential.

For increasing the strength and the withstanding voltage of the insulation resins, use of a resin material with addition of fine particles to resins is effective. Particularly, since fine particles of 1 to 100 nm diameter have a large surface area relative to the volume of the fine particle, improvement in the property of the resins is expected with a small addition amount.

For insulation resin materials with addition of fine particles to resins the following techniques have been known. JP-A No. 2005-241977 describes that stability with time of heat resistance, adhesion, and electric insulation is improved by the addition of a polyhydroxyl carboxylic acid ester additive and silica to a carboxyl group-containing resin. It is described that a thixotropic property is improved thereby improving the coating property of the resin, particularly, by the use of a hydrophilic silica.

JP-A No. 2008-31193 describes that modulus of elasticity, heat resistance, and toughness are improved by adding nano-particles and a block copolymer to an epoxy resin. It is described that the dispersibility of them to the epoxy resin is improved, particularly, by hydrophobizing the surface of inorganic nano particles.

JP-A No. H09 (1997)-326559 discloses a prepreg improved in the adhesion between a resin and a copper foil by adding a fiber base material, brucite, and super fine particles of silica to an epoxy resin. It is described that the dispersibility is improved, particularly, with hydrophobized silica.

It has been known that when particles are aggregated inside an insulation resin the mechanical strength and the withstanding voltage of the resin are not improved but they are improved by uniformly dispersing the fine particles in the resin. However, it has been found that when fine particle are dispersed uniformly, the mechanical property and the withstanding voltage of a hardened resin material are not improved and, particularly, resistance to crack propagation is not improved. Accordingly, distribution of fine particles inside the resin is one of main factors that determine the property of the resin. It is an important subject to determine the distribution of fine particles capable of improving the mechanical strength and the withstanding voltage, and define a combination of the fine particles and the resin capable of realizing such a distribution of the fine particles.

The above-mentioned patent documents do not select the combination of the fine particles and the resin material and not disclose the optimum constitution with the view points described above.

The present invention intends to improve the mechanical strength and the withstanding voltage of a resin material and provide high voltage equipment capable of improving the reliability by using the resin material of the invention to the high voltage equipment.

SUMMARY OF THE INVENTION

The invention provides a resin material which is a hardened product containing fine particles and resin ingredients in which the fine particles have hydrophobic groups on the surface, the resin ingredients have hydrophilic groups on the side chains, and the fine particles form a plurality of linear aggregates inside the resin. Further, the invention also provides electric equipment using the resin material described above.

According to the invention, an insulation resin material having high strength and high withstanding voltage can be formed, and this contributes to the size reduction of the high voltage equipment using the resin material.

BRIEF DESCRIPTION OF THE DRAWINGS

FIG. 2 is a view observing the cross section of resin main agents under SEM (scanning microscope), in which

FIG. 3 is a conceptional view for the mechanism of crack development in the resin material, in which

FIG. 4 is an optical microscopic photograph after dying the fracture surface of the resin material with a methylene blue solution in which

DETAILED DESCRIPTION OF THE PREFERRED EMBODIMENTS

Figure 1:
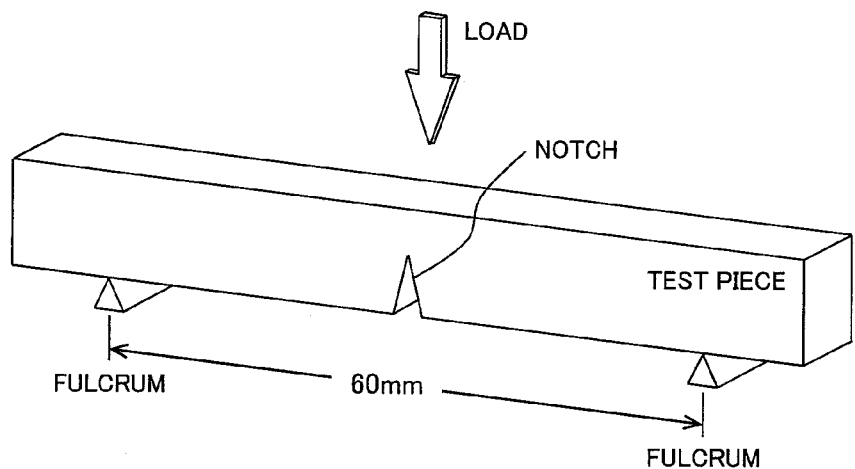
FIG. 1 is an explanatory view for a shape of a test piece subjected to a three-point bending test and an outline of the three-point bending test.

For solving the subjects described above, the present invention provides a resin material in which fine particles having hydrophobic groups on the surface are incorporated in a resin having hydrophilic groups on the side chains, and the fine particles form a linear structure inside the resin thereby forming a dendritic structure. Further, the invention provides high voltage equipment using the resin material described above to portions requiring insulation. In JP-A No. H09-326559, since the fiber basic material using long fibers such as a glass cloth is incorporated in the resin for obtaining the prepreg, even when hydrophobic fine particles are dispersed sufficiently into a resin phase, the fine particles cannot be aggregated subsequently and cannot take a dendritic structure, so that the resistance to track development cannot be improved.

The constitution of the resin material according to the invention (resin phase and dendritic fine particle aggregates) is a structure of a hardened product and does not define the constitution of a resin composition before hardening.

The resin material according to the invention, is used for high voltage equipment, particularly, to portions requiring insulation where mechanical strength is desired, in which fine particles modified at the surface with hydrophobic groups are incorporated inside the resin having hydrophilic groups on the side chain, and the fine particles have a linear structure or a dendritic structure inside the resin.

The resin usable herein includes epoxy resins having hydroxyl groups on the side chain, acrylic resins typically represented by polymethyl methacrylate having carboxyl groups on the side chain, and resins such as nylon having hydrophilic side chains having an amide bond.

The fine particles include those particles formed of inorganic compounds, organic compounds, or organic/inorganic composite materials. The inorganic compounds include those inorganic compounds, for example, silicon compounds such as silica and silicone, inorganic oxides such as alumina and titania, nitrides such as aluminum nitride. The organic compounds include those organic compounds, for example, organic elastomers such as styrene butadiene rubber and nitrile rubber. The organic/inorganic composite materials include those organic/inorganic composite materials such as organic clays in which the surface of inorganic minerals such as mica is modified with an organic acid salt. Fine particles modified at the surface with a compound having a hydrophobic group, typically, methyl group, methoxy group, alkyl group, or alkoxy group can be used.

Further, a combination of fine particles and a resin usable in the invention is in such a relation that the hydrophilicity of a compound of modifying the surface of the fine particles is lower than the hydrophilicity of side chains of the resin.

The shape of the fine particle is preferably spherical but the shape of the fine particle may also include an indefinite shape. In the invention, the spherical shape includes not only a truly spherical shape but also a shape somewhat deformed from the truly spherical shape, so long as the ratio of the longer diameter to the shorter diameter is within a range up to about 3:1.

The addition amount of the hydrophobic fine particles is preferably from 2 to 8 mass % and particularly preferably 2.5 to 6 mass % based on the mass of the resin ingredients. Different from usual fillers, the hydrophobic fine particles of the invention are added by a smaller amount compared with usual fillers. Since the specific surface area of the fine particles is extremely large, they can also provide an effect as the filler. Further, usual organic or inorganic filler well-known in the relevant field can also be added. Further, short fibers at a length of several mm or less, particularly, 1 mm or less and other additives such a as flame retardant, colorant, etc. can also be added.

Generally, surface hydrophilized fine particles tend to be dispersed to a resin having hydrophilic side chains and show a good dispersion state inside the resin. On the other hand, surface hydrophobized fine particles are less dispersed in the hydrophilic resin and tend to aggregate or precipitate inside the resin.

In a preferred embodiment of the invention, hydrophobic fine particles are distributed inside the resin without being aggregated inside the hydrophilic resin. Further, a linear structure or a dendritic structure of the fine particles is formed inside the resin thereby improving the strength of the resin.

Accordingly, resin ingredients (an acid hardening agent and, if necessary, a hardening promoter, etc. can be incorporated in a case of an epoxy resin) and hydrophobic fine particles are sufficiently stirred by using an appropriate stirring device. Fine particles once mixed uniformly start aggregation after a while to form a dendritic structure. The dendritic structure improves the mechanical strength of the hardened resin material of the invention. When hydrophilic silica is dispersed by stirring into a resin having hydrophilic groups, for example, an epoxy resin, it is dispersed uniformly but does not form the dendritic structure as in the resin material of the invention.

In the following Examples 1 to 6, an epoxy resin is used as a resin having hydrophilic side chains and silica is used as the fine particles, and the effect thereof is to be shown.

Any epoxy resin may be used so long as the resin comprises a compound containing two or more epoxy groups each having two carbon atoms and one oxygen atom in the molecule in which the epoxy group can be put to ring-opening reaction with an appropriate hardening agent to form a hardened resin product.

Preferred examples of the epoxy resin include, for example, bisphenol A epoxy resin obtained by condensation of epichlorhydrin and polyhydric phenols such as bisphenols or polyhydric alcohols, brominated bisphenol A epoxy resin, hydrogenated bisphenol A epoxy resin, bisphenol F epoxy resin, bisphenol S epoxy resin, bisphenol AF epoxy resin, biphenyl epoxy resin, naphthalene epoxy resin, fluorene epoxy resin, novolac epoxy resin, phenol novolac epoxy resin, ortho-cresol novolac epoxy resin, tris(hydroxyphenyl) methane epoxy resin, glycidyl ether epoxy resin such as tetraphenylol ethane epoxy resin, glycidyl ester epoxy resin obtained by condensation of epichlorhydrin and carboxylic acid, and heterocylic epoxy resin such as hydantoin epoxy resin obtained by reaction of triglycidyl isocyanate or epychlorhydrin and hydantoin. The resins can be used alone or as a mixture of two or more of them.

In combination with the hardening agent for the epoxy compound, a hardening promoter for the epoxy compound for promoting or controlling the hardening reaction of the epoxy compound may also be added. Particularly, when an acid anhydride hardening agent is added, since the rate of the hardening reaction is lower compared with other hardening agents such as an amine type hardening agent, a hardening promoter for epoxy compound is often used. The hardening promoter for the epoxy compound may include ternary amines or salts thereof, quaternary ammonium compounds, imidazoles, alkali metal alkoxide, etc.

Since a number of silanol groups (SiOH groups) are present on the surface of the silica used as the fine particles, the surface exhibits hydrophilicity. While it is said that silica formed by a flame deposition method has relatively less silanol groups, silica still has SiOH groups on the surface and exhibits hydrophilicity.

Hydrophobized nano silica is formed by substituting the silanol groups on the surface with alkyl groups, etc. so as to improve the dispersibility in accordance with the hydrophilicity or hydrophobicity of the resin.

It has been known that the viscosity does not increase greatly when hydrophilic nano silica is dispersed in the epoxy resin before hardening, whereas the viscosity tends to increase to show thixotropy when the surface hydrophobized silica is dispersed.

It is considered that the thixotropy is developed due to generation of hydrophobic interaction between hydrophobized silica to each other (apparent force exerting between the hydrophobic particles to each other in a hydrophilic solvent)

thereby forming a surface hydrophobized silica structure (gel state) to an epoxy resin having hydrophilic groups on the side chains.

The following examples shows that the toughness of the hardened resin is increased when such structure is maintained also after the hardening treatment. The resin material according to the invention may also contain additives such as sagging inhibitor, a precipitation inhibitor, a defoamer, a leveling agent, a slipping agent, a dispersant, a substrate wetting agent, etc. within such a range as not impairing the desired effect of the invention.

The resin material according to the invention is manufactured based on each of the materials described above in the procedures as described below. At first, fine particles are mixed in the resin as a matrix while exerting at least one of shearing force and stretching force. At least one of inorganic oxide, layered clay compound, layered mica, and fine elastomer may also be added optionally within a range not impairing the desired effect of the invention. Thus, fine silica particles are dispersed in an epoxy resin.

While a rotation/revolution mixer is used as a device for mixing, this is not limitative so long as the device can perform mixing while exerting shearing force or stretching force. For example, a bead mill mixer, a three-roll mill mixer, a homogenizer mixer, a resin mixer with stirring blade, etc. can be used.

The resin material according to the invention manufactured as described above is used for high voltage electric equipment such as a molded transformer, a switchgear, a motor, or an inverter in portions requiring insulation and mechanical strength, thereby capable of increasing the strength and the withstanding voltage of the insulated portions to improve the reliability of the high voltage equipment. In addition, the resin material of the invention can be used also to a manipulation rod or an insulation rod of an interrupter, etc.

EXAMPLE 1

In Example 1, resin materials having the constitutions in Tables 1 and 2 were manufactured for showing the effect of the surface hydrophobized silica added to the inside of an epoxy resin. Table 1 shows constituent ingredients in common with the resin materials prepared in this example and the mass ratio thereof. The epoxy resin has a typical bisphenol A structure and has two epoxy groups in one molecule of the monomer. As the hardening agent, phthalic acid anhydride as an acid anhydride was used.

TABLE 1

| Common constituent ingredient | State | Mass ratio |
|---|---|---|
| Resin main agent Epoxy resin | Liquid | 1.0 |
| Hardening agent Acid anhydride | Liquid | 0.8 |

Resin materials were manufactured by adding fine particles to the common constituent ingredients in Table 1. A material with no addition of fine particles and materials with addition of two types of fine particles were prepared and the resin materials (A) to (C) shown in Table 2 were manufactured.

As shown in Table 2, the resin material (A) is a standard specimen with no addition of the fine particles. The resin material (B) is a specimen with addition of not surface modified hydrophilic silica (Aerosil 200, manufactured by Aerosil Co.), which is a comparative specimen to the resin material of the invention. The resin material (C) is a resin material according to the invention with addition of silica in which the surface is hydrophobized by methyl groups (Aerosil RY200, manufactured by Aerosil Co.).

TABLE 2

| | Fine particles | | | Fracture toughness |
|---|---|---|---|---|
| | Type | State | Surface treatment | Addition amount | (relative value)* |
| Resin material (A) | None | — | — | — | 1.0 |
| Resin material (B) | Silica | Liquid | None (hydrophilic) | 3 wt % | 1.1 |
| Resin material (C) | Silica | Liquid | Hydrophobized | 3 wt % | 1.2 |

*Relative value to resin material (A)

The addition amount of the fine particle silica was 3 wt % based on the entire resin material. The primary particle diameter of the fine silica particle was about 12 nm in each case. In the epoxy resin used for a molded transformer, a great amount of silica, etc. of μm size or more are also added. This is for reducing the cost and suppressing the linear expansion coefficient of the material. However, μm size silica, etc. were not added in this example, since the example intended to show the effect by the addition of the fine particles.

Test specimens obtained by hardening each of the resin materials (A) to (C) were manufactured as described below. At first, an epoxy resin, fine particles, and a hardening agent were placed in separate vessels and heated to 80° C.

Then, the fine silica particles and the hardening agent shown in Example 2 were charged to the epoxy resin and stirred by a rotation/revolution mixer. Then, the resin was hardened by the following procedure. Each of the resin materials (A) to (C) was cast into a metal mold while keeping the temperature, and hardened at 80° C. for 8 hours and then at 140° C. for 12 hours. After gradual cooling for 5 hours, the cast product was demolded to form a test specimen shown in FIG. 1.

Using the thus manufactured test piece, the fracture toughness value was measured in accordance with ASTM D5045 by weighing a load till the test piece was fractured in a three-point bending test. The relative value of the fracture toughness to that of the test specimen formed by hardening the resin material (A) is shown in the right column of Table 2.

In view of Table 2, the following can be seen. The fracture toughness of the resin is improved more by adding the fine silica particles compared with the case of not adding the fine particles. Improvement is obtained only by about 10% with the hydrophilic silica, whereas improvement is obtained as much as by 20% with the hydrophobized silica.

Figure 2A:
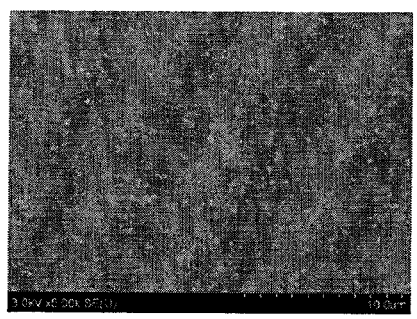
FIG. 2A is a view observing a resin material (B)
Figure 2B:
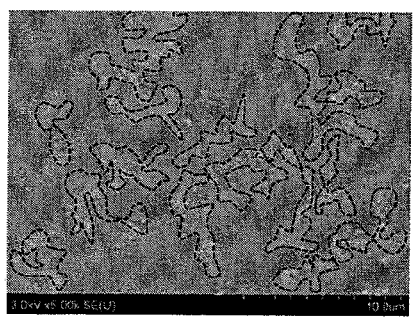
FIG. 2B is a view observing a resin material (C)

For each of the fine silica particles, distribution inside the resin after hardening was measured under a cross section SEM (scanning electron microscope). FIGS. 2A and 2B show the results. Broken lines for the resin material (C) shown in FIG. 2B represent the boundaries of regions where fine particles are gathered closely which were indicated on SEM images by the inventors.

In the resin material (B) shown in FIG. 2A, it can be seen that the hydrophilic silica is dispersed uniformly inside the resin. On the other hand, in the resin material (C), while hydrophobic silica is dispersed in the entire resin but a plurality of linear aggregates are observed as shown by broken lines.

This shows that a structure formed by thixotropic nature between hydrophobized silica particles to each other (gelled state) is maintained in the epoxy resin having hydrophilic groups also after the hardening treatment and the toughness of the hardened resin is increased by the formation of the structure.

EXAMPLE 2

Broken lines in the resin material (C) in FIG. 2B represent a region where the fine particles are present when the lumps of the fine particles present in the distance of about 0.5 µm or less are joined. The length or the size of the linear aggregate is 1 µM or more, which corresponds to about 100 times of 12 nm particle diameter of the fine silica particle. It is considered that fine particles by the number of about 100 have to be contained in the gelled structure in order that fine silica particles function in the gelled state.

In order that the linear aggregates extend over the entire resin, it is necessary that the maximum distance between the linear aggregates should also correspond to the length of fine particles by the number of 100 or more (1 µm), which is the length of the linear structure as the structure of the gel.

However, when the minimum distance between the plurality of linear (dendritic) aggregates is large, linear aggregates form isolate aggregates but cannot form a gel structure extending over the entire resin. Accordingly, it is desired that the minimum distance between the linear structures corresponds to the fine particles by the number of 100 or less.

EXAMPLE 3

As can be seen from the SEM image for the resin material (C) in FIG. 2B, a plurality of linear structures are in contact with each other inside the resin to form a network structure.

Figure 3A:
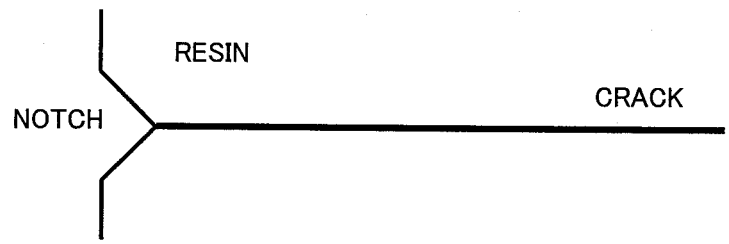
FIG. 3A is a conceptional view for the resin material (A) and FIG. 3B is a conceptional view for the resin material (C)
Figure 3B:
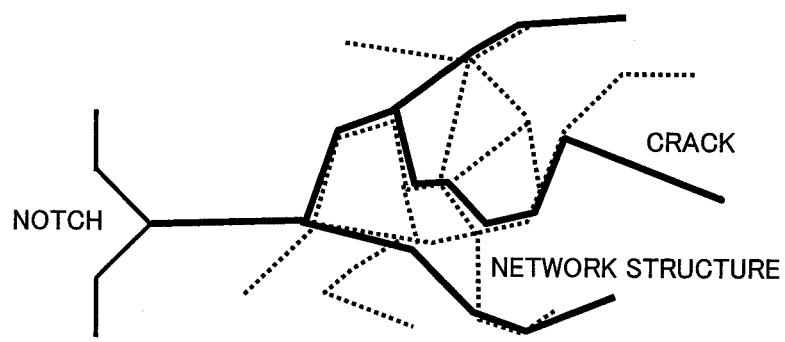

FIG. 3A and FIG. 3B are respectively estimated conceptional figures for the mechanism of crack development of the resin material (A) (with no addition of fine particles) and the resin material (C) with addition of hydrophobic silica. In a case with no addition of the fine silica particles, since the structure for inhibiting the crack development is not present, cracks are not branched and, as a result, a strong shear force propagates to the top end of the crack leading to the fracture of the entire resin. On the other hand, in a case of the resin with addition of nano silica (hydrophobized at the surface), it is considered that the network structure formed inside the resin inhibits the crack development and the cracks are branched, so that the stress at the top end of the crack is dispersed and, as a result, fracture of the entire resin is suppressed.

Figure 4A:
FIG. 4A is a photograph for the resin material (A)
Figure 4B:
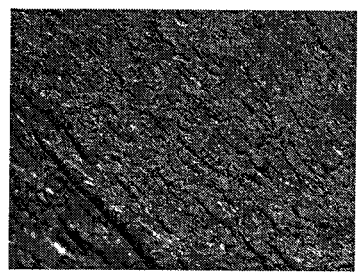
FIG. 4B is a photograph for the resin material (C)
Figure 5:
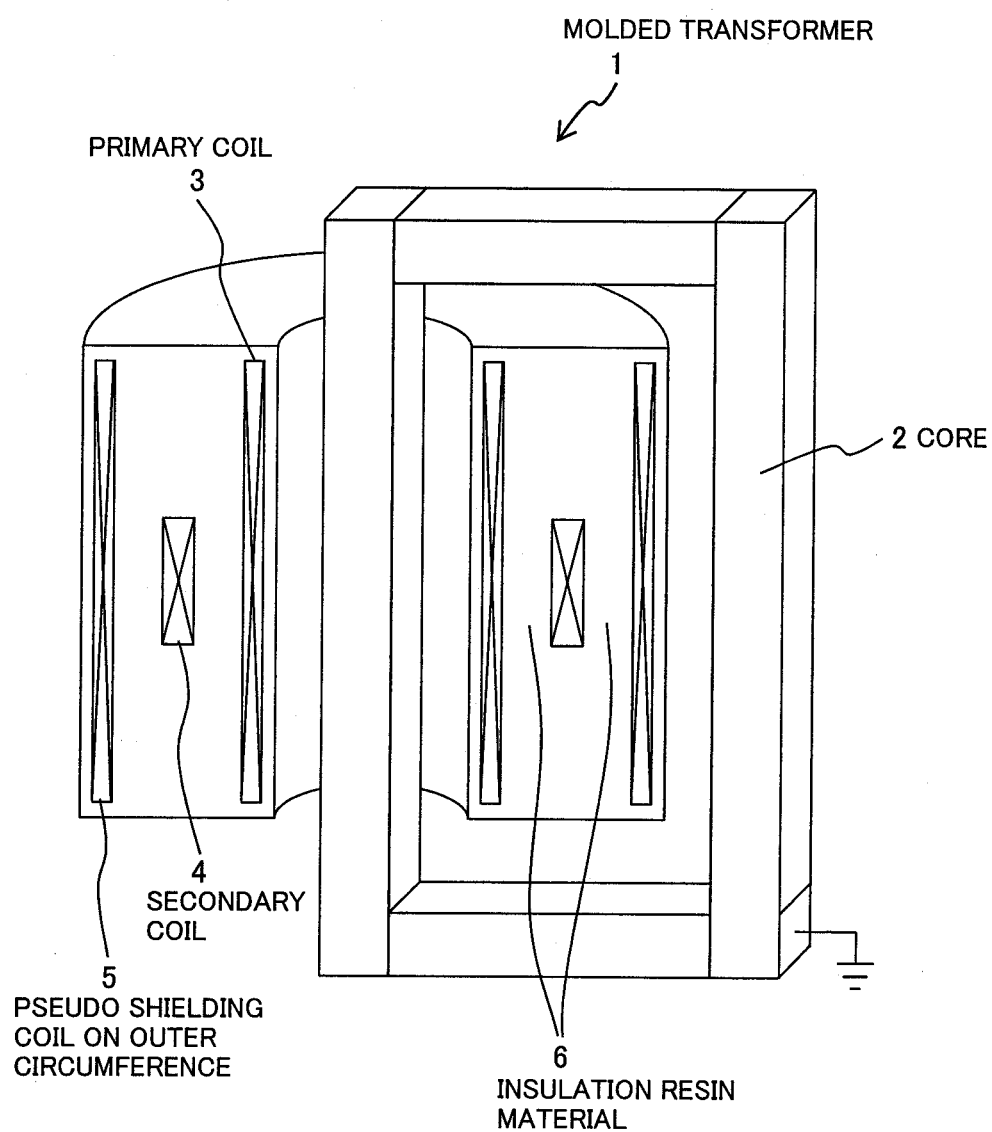
FIG. 5 is a fragmentary cross sectional view showing the state of using an insulation cast resin for electric equipment according to the invention to a molded transformer as high voltage electronic equipment.

FIG. 4A and FIG. 4B show optical microscopic photographs for the fracture surface. FIG. 4A is a microscopic photograph for the resin material not containing the fine particles and FIG. 4B is a microscopic photograph for the resin material (C). The fracture surface is dyed with a methylene blue solution. Accordingly, a black area is a not dyed surface (FIG. 4A) and an area showing a linear pattern is a dyed surface (FIG. 4B). The followings are shown from FIG. 4A and FIG. 4B.

It can be seen that the fracture surface of the resin with no addition of fine particles (FIG. 4A) is scarcely dyed and smooth in which fracture proceeds not undergoing substantial hindrance in the direction of the fracture. On the other hand, in a case of the resin with addition of the hydrophobic silica (FIG. 4B), dyeing can be confirmed distinctly and, in addition, a number of grooved structures are observed and it can be seen that fracture is inhibited by the dendritic structure where linear aggregates are combined in a complicated manner.

When resin ingredients having hydrophilic groups and fine particles having hydrophobic groups are stirred and mixed, the fine particles once dispersed uniformly in the resin phase are aggregated and, after lapse of a certain time, take a shape as if they were dendrites thereby forming a dendritic structure. The dendritic structure extends in a three dimensional direction and, as a result, resistance to crack development of the hardened resin can be improved in all of the directions. On the contrary, when fine particles having a particle diameter at the nano order are dispersed uniformly in the resin phase, since the particles are small, they have no function of suppressing the crack development and it was confirmed that the crack proceeds easily. Accordingly, the dendritic aggregates of the invention have a feature of providing the function as if the diameter of the fine particles were enlarged.

In view of the above, it can be seen that the linear structures formed by the fine particles inside the resin are in contact with each other to form a network structure and this is effective for increasing the toughness.

EXAMPLE 4

The average particle diameter of the hydrophobic silica used in Example 1 is 12 nm. As the average particle diameter of the fine particles is smaller, the surface area relative to the volume of the particle is larger and the effect is provided with a smaller amount of addition.

The minimum particle diameter that can be formed by the fine silica particle is 1 nm. On the other hand, the silica particles having the particle diameter of sub micrometer or more cause precipitation due to the weight of the particles and easy dispersibility of the particles into the resin is not determined only by the hydrophilic or hydrophobic property of the silica surface. Accordingly, the particle diameter capable of realizing more easily means that forms the linear structure or the dendritic structure of the invention is from 1 to 100 nm.

EXAMPLE 5

In the hydrophobic silica used in Example 1, hydrophilic groups of usual silica are substituted with methyl groups. Organic compounds that provide identical hydrophobicity include methoxy group, alkyl group, and alkoxy group.

EXAMPLE 6

The resin materials described above are used to high voltage electric equipment such as a mold transformer, a switchgear, a motor, or an inverter in portions requiring insulation. Since the insulated portions can be increased in the strength, reliability of the high voltage equipment can be improved. For example, referring to a case of using the resin material (C) of Example 1 to a mold transformer, the mold transformer includes a core 2, primary coils 3 at a low voltage wound around the core 2, secondary coils 4 at a higher voltage than the primary coils 3 disposed to the outer side of the primary coils 3, and pseudo shielding coils 5 on the outer circumferential side disposed to the outer side of the secondary coils 4. The primary coils 3, the secondary coils 4, and pseudo shielding coils 5 on the outer circumferential side are resin molded integrally together with a insulation resin material 6. As the insulation resin material 6, resin material (C) is used. The viscosity of the composition in this case is 100 Pa/sec or lower. In view of easy casting, it is preferred to control the viscosity to 20 to 30 Pa/sec irrespective of the application use.

The insulation material 6 is formed as described below. A liquid mixture formed by stirring and mixing a not yet hardened resin, fine particles, and a hardening agent by a rotation/revolution mixer, etc. is cast under pressure into a mold. The liquid mixture of the not yet hardened resin of the resin material (C), the fine particles, and the hardening agent tends to show a higher viscosity due to the thixotropic property thereof and tends to generate voids in the mold. In order to prevent such voids, pressure casting mold such as a transfer molding die or an injection molding die can be used. After casting the liquid mixture, the resin is hardened to form the insulation material 6. Further, before forming the insulation material 6, voids between the coils and the resin can be prevented reliably by previously coating a varnish in fine gaps between enamel winding wires for forming the coils.

The pseudo shielding coils 5 on the outer circumferential side are connected by way of the insulation resin material 6 to one end of the secondary coils 4 at a ground potential. With the mold transformer 1, the fracture toughness can be improved and the strength is increased due to the use of the resin material according to the invention. Therefore, the mold transformer 1 can be reduced in the size, decreased in the weight, and increased for the life. Further, the resin material according to the invention can suppress electric discharge at degraded portions where cracks are generated, causes no partial electric discharge for the mold transformer 1, can maintain the reliability for a long time, and enables long time operation. Further, the transformer can be used to a higher voltage at a size equivalent with that of existent transformers.

The resin material according to this invention is excellent in the cracking resistance, has increased strength, and can be utilized as a molding material and an insulating substrate etc, for various types of electric equipment.

What is claimed is:

1. A resin material which is a hardened product containing fine particles and resin ingredients,
    wherein the resin ingredients comprise a bisphenol A epoxy resin comprising hydrophilic groups on side chains,
    the fine particles are formed of inorganic compounds, organic compounds, or organic/inorganic composite materials, the fine particles comprise organic hydrophobic groups on the surface and have a particle diameter of 200 nm or less, and an addition amount of the fine particles is from 2.5 to 6 mass % based on the mass of the resin ingredients,
    a resin composition comprising the fine particles and the resin ingredients before hardening shows a thixotropic property, and
    a plurality of linear aggregates formed of the fine particles inside the resin material thereby form a dendritic structure which extends in a three-dimensional direction in the resin material.

2. A resin material according to claim 1, wherein the length or the size of each aggregate of the plurality of linear aggregates is 100 times as large as the particle diameter of a fine particle of the fine particles, the maximum distance between each aggregate of the plurality of linear aggregates is 100 times or more the particle diameter of the fine particle, and the minimum distance between each aggregate of the plurality of linear aggregates is 100 times or less the particle diameter of the fine particle.

3. A resin material according to claim 1, wherein the dendritic structure comprises branches formed by the plurality of linear aggregates.

4. A resin material according to claim 1, wherein the primary particle diameter of each of the fine particles having the hydrophobic groups is from 1 to 100 nm.

5. A resin material according to claim 1, wherein the fine particles comprise silica modified at the surface with an organic compound.

6. A resin material according to claim 5, wherein the organic compound has at least one hydrophobic group comprising a methyl group, a methoxy group, an alkyl group, and an alkoxy group.

7. A resin material according to claim 1, wherein a fine particle of the fine particles is in a spherical shape having a ratio of a longer diameter to a shorter diameter of 3:1 or less.

8. High voltage electric equipment having an insulation material and a conductive portion in which a resin material according to claim 1 is used in the insulation material in at least portions requiring mechanical strength and an insulation property.

9. A resin material according to claim 1, wherein the hydrophobic groups are selected from the group consisting of a methyl group, a methoxy group, an alkyl group, and an alkoxy group.

10. A resin material which is a hardened product, the resin material comprising:
    resin ingredients, wherein the resin ingredients comprise a bisphenol A epoxy resin comprising hydrophilic groups on side chains; and
    fine particles, wherein surfaces of the fine particles are modified with hydrophobic groups, the fine particles have a particle diameter of 200 nm or less, and an addition amount of the fine particles is from 2.5 to 6 mass % based on the mass of the resin ingredients,
    wherein a resin composition comprising the fine particles and the resin ingredients comprises a thixotropic property before hardening, and
    a plurality of aggregates formed of the fine particles inside the resin material thereby form a dendritic structure which extends in a three-dimensional direction in the resin material.

11. A resin material according to claim 10, wherein the dendritic structure comprises branches formed by the plurality of aggregates.

12. A resin material according to claim 10, wherein the primary particle diameter of each of the fine particles having the hydrophobic groups is from 1 to 100 nm.

13. A resin material according to claim 10, wherein the fine particles comprise silica with the surfaces modified with the hydrophobic groups.

14. High voltage electric equipment having an insulation material and a conductive portion in which a resin material according to claim 10 is used in the insulation material in at least portions requiring mechanical strength and an insulation property.

* * * * *